(12) United States Patent
Ho et al.

(10) Patent No.: US 7,346,643 B1
(45) Date of Patent: Mar. 18, 2008

(54) PROCESSOR WITH IMPROVED ACCURACY FOR MULTIPLY-ADD OPERATIONS

(75) Inventors: Ying-wai Ho, Los Altos, CA (US); John L. Kelley, San Francisco, CA (US); XingYu Jiang, San Jose, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 09/364,512

(22) Filed: Jul. 30, 1999

(51) Int. Cl.
*G06F 7/48* (2006.01)

(52) U.S. Cl. .................................. 708/501

(58) Field of Classification Search ............. 708/501
See application file for complete search history.

(56) References Cited

U.S. PATENT DOCUMENTS

| | | | |
|---|---|---|---|
| 4,156,279 A | 5/1979 | Wilhite | 364/200 |
| 4,511,990 A | 4/1985 | Hagiwara et al. | 364/748 |
| 4,839,846 A | 6/1989 | Hirose et al. | 708/497 |
| 4,866,652 A | 9/1989 | Chu et al. | 364/748 |
| 4,879,676 A | 11/1989 | Hansen | 364/748 |
| 5,025,407 A | 6/1991 | Guley et al. | 364/754 |
| 5,038,313 A | 8/1991 | Kojima | 364/736.5 |
| 5,159,665 A | 10/1992 | Priem et al. | 395/134 |
| 5,185,713 A * | 2/1993 | Kobunaya | 708/501 |
| 5,206,823 A | 4/1993 | Hesson | 364/748 |
| 5,220,524 A | 6/1993 | Hesson | 708/502 |
| 5,257,216 A | 10/1993 | Sweedler | 364/748 |
| 5,278,949 A | 1/1994 | Thayer | 395/126 |
| 5,341,321 A | 8/1994 | Karp et al. | 364/748 |
| 5,357,599 A | 10/1994 | Luken | 395/134 |
| 5,359,548 A | 10/1994 | Yoshizawa et al. | 364/748 |
| 5,367,650 A | 11/1994 | Sharangpani et al. | 395/375 |
| 5,392,228 A | 2/1995 | Burgess et al. | 364/715.04 |
| 5,420,966 A | 5/1995 | Silverbrook | 395/122 |
| 5,420,971 A | 5/1995 | Westerink et al. | 395/133 |
| 5,511,016 A | 4/1996 | Bechade | 364/745 |
| 5,517,438 A | 5/1996 | Dao-Trong et al. | 364/748 |
| 5,530,663 A | 6/1996 | Garcia et al. | 364/748 |
| 5,550,767 A | 8/1996 | Taborn et al. | 364/745 |
| 5,550,768 A * | 8/1996 | Ogilvie et al. | 708/497 |
| 5,553,015 A | 9/1996 | Elliott et al. | 364/748 |
| 5,602,769 A | 2/1997 | Yu et al. | 364/748 |
| 5,619,198 A | 4/1997 | Blackham et al. | 341/150 |
| 5,631,859 A | 5/1997 | Markstein et al. | 364/748 |
| 5,652,875 A | 7/1997 | Taylor | 395/500 |
| 5,671,170 A | 9/1997 | Markstein et al. | 364/748 |

(Continued)

OTHER PUBLICATIONS

Kubosawa et al., "Four-Way VLIW Geometry Processor for 3D Graphics Applications", Dec. 1, 1999, p. 39-47.

(Continued)

*Primary Examiner*—D. H. Malzahn
(74) *Attorney, Agent, or Firm*—Sterne, Kessler, Goldstein & Fox PLLC

(57) ABSTRACT

Floating-point processors capable of performing multiply-add (Madd) operations and incorporating improved intermediate result handling capability. The floating-point processor includes a multiplier unit coupled to an adder unit. In a specific operating mode, the intermediate result from the multiplier unit is processed (i.e., rounded but not normalized or denormalized) into representations that are more accurate and easily managed in the adder unit. By processing the intermediate result in such manner, accuracy is improved, circuit complexity is reduced, operating speed may be increased.

26 Claims, 6 Drawing Sheets

U.S. PATENT DOCUMENTS

| | | | |
|---|---|---|---|
| 5,671,401 A | 9/1997 | Harrell | 395/505 |
| 5,701,442 A | 12/1997 | Ronen | 395/500 |
| 5,720,019 A | 2/1998 | Koss et al. | 395/134 |
| 5,726,927 A | 3/1998 | Wolrich et al. | 364/754 |
| 5,729,724 A | 3/1998 | Sharangpani et al. | 395/563 |
| 5,764,555 A | 6/1998 | McPherson et al. | 364/748 |
| 5,768,170 A | 6/1998 | Smith | 364/748.1 |
| 5,774,709 A | 6/1998 | Worrell | 395/580 |
| 5,790,827 A | 8/1998 | Leung | 395/392 |
| 5,793,661 A | 8/1998 | Dulong et al. | 364/750.5 |
| 5,805,486 A | 9/1998 | Sharangpani | 364/736.04 |
| 5,809,294 A | 9/1998 | Ando | 395/580 |
| 5,815,695 A | 9/1998 | James et al. | 395/561 |
| 5,847,979 A | 12/1998 | Wong et al. | 364/748.06 |
| 5,848,269 A | 12/1998 | Hara | 395/586 |
| 5,852,726 A | 12/1998 | Lin et al. | 395/376 |
| 5,862,066 A | 1/1999 | Rossin et al. | 364/736 |
| 5,867,682 A | 2/1999 | Witt et al. | 395/386 |
| 5,880,983 A | 3/1999 | Elliott et al. | 364/748.07 |
| 5,880,984 A * | 3/1999 | Burchfiel | 708/523 |
| 5,889,690 A | 3/1999 | Arakawa | 364/748.07 |
| 5,892,698 A | 4/1999 | Naffziger | 364/748.07 |
| 5,901,076 A | 5/1999 | Lynch | 364/748.11 |
| 5,923,577 A | 7/1999 | Wong et al. | 364/748.08 |
| 5,928,316 A | 7/1999 | Wong et al. | 708/501 |
| 5,953,241 A * | 9/1999 | Hansen et al. | 708/501 |
| 5,977,987 A | 11/1999 | Duluk, Jr. | 345/441 |
| 5,982,380 A | 11/1999 | Inoue et al. | 345/434 |
| 5,995,122 A | 11/1999 | Hsieh et al. | 345/523 |
| 5,996,066 A | 11/1999 | Yung | 712/221 |
| 5,999,960 A | 12/1999 | Gerwig et al. | 708/500 |
| 6,035,316 A * | 3/2000 | Peleg et al. | 708/523 |
| 6,065,115 A | 5/2000 | Sharangpani et al. | 712/235 |
| 6,115,729 A * | 9/2000 | Matheny et al. | 708/501 |
| 6,169,554 B1 | 1/2001 | Deering | 345/434 |
| 6,175,370 B1 | 1/2001 | Kunimatsu | 345/434 |
| 6,175,851 B1 | 1/2001 | Iourcha et al. | 708/505 |
| 6,175,907 B1 | 1/2001 | Elliott et al. | 712/1 |
| 6,199,089 B1 | 3/2001 | Mansingh | 708/497 |
| 6,249,798 B1 | 6/2001 | Golliver et al. | 708/490 |
| 6,268,875 B1 | 7/2001 | Duluk, Jr. et al. | 345/506 |
| 6,269,385 B1 | 7/2001 | Han et al. | 708/596 |
| 6,275,838 B1 | 8/2001 | Blomgren et al. | 708/501 |
| 6,285,378 B1 | 9/2001 | Duluk, Jr. et al. | 345/441 |
| 6,285,779 B1 | 9/2001 | Lapidous et al. | 382/106 |
| 6,298,365 B1 | 10/2001 | Dubey et al. | 708/495 |
| 6,401,108 B1 | 6/2002 | Van Nguyen | 708/671 |
| 6,426,746 B2 | 7/2002 | Hsieh et al. | 345/419 |
| 6,510,446 B1 | 1/2003 | Fukagawa | 708/497 |
| 6,535,898 B1 | 3/2003 | Yuval | 708/204 |
| 6,581,087 B1 | 6/2003 | Inoue et al. | 708/671 |

OTHER PUBLICATIONS

Higaki et al., "A 2.5 GFLOPS 6.5 Million Polygons per Second 4-Way VLIW Geometry Processor with SIMD Instructions and a Software Bypass Mechanism," IEEE International Solid-State Circuits Configuration, 1999.

Hughes, PL.I Programming, 1973, John Wiley & Sons, pp. 5, 15-16, 74-75, 188-189, 217, 411-416, 423-424, and 689-690.

Ito, Masayuki et al., "Efficient Initial Approximation for Multiplicative Division and Square Root by Multiplication with Operand Modification", IEEE Transactions on Computers, vol. 46, No. 4, Apr. 1997, pp. 495-498.

Diefendorff, Keith et al., "AltiVec Extension to PowerPC Accelerates Media Processing," IEEE Micro, pp. 85-95, Mar.-Apr. 2000.

Higaki et al., "A 2.5 GFLOPS 6.5 Million Polygons per Second 4-Way VLIW Geometry Processor with SIMD Instructions and a Software Bypass Mechanism," IEEE International Solid-State Circuits Conference, 1999.

Kubosawa et al., "A 2.5-GFLOPS, 6.5 Million Polygons per Second, Four-Way VLIW Geometry Processor with SIMD Instructions and a Software Bypass Mechanism," IEEE Journal of Solid-State Circuits, vol. 34, No. 11, pp. 1619-1626, Nov. 1999.

Kubosawa et al., "Four-Way VLIW Geometry Processor for 3D Graphics Applications," Fujitsu Sci. Tech. J., 36, 1, pp. 39-47, Jun. 2000 (manuscript received Dec. 1, 1999).

"MIPS Extension for Digital Media with 3D," MIPS Technologies, Inc., pp. 1-26, Dec. 27, 1996.

Thekkath et al, "An Architecture Extension for Efficient Geometry Processing," pp. 1-23, Presented at Hot Chips 11, A Symposium of High-Performance Chips, Stanford Univ. (Aug. 1999) (submitted for conference review Jul. 14, 1999).

Uhler, M., "Optimizing Game Applications for the MIPS RISC Architecture," 1999 Computer Game Developer's Conference, San Jose, CA, 14 pages (Mar. 1999) (submitted for conference review on Feb. 12, 1999).

Uhler, M., "Optimizing Game Applications for the MIPS RISC Architecture," 1999 Computer Game Developer's Conference, San Jose, CA, slides 1-22 (Mar. 1999).

Kubosawa, H. et al., "A 2.5-GFLOPS, 6.5 Million Polygons per Second, Four-Way VLIW Geometry Processor with SIMD Instructions and a Software Bypass Mechanism," IEEE Journal of Solid-State Circuits, IEEE, vol. 34, No. 11, pp. 1619-1626, (Nov. 1999) (appears to correspond to document ARI, Higaki, N. et al.).).

Rice et al, "Multiprecision Division on a 8-Bit Processor," Computer Arithmetic, 1997 (Proceedings, 13th IEEE Symposium on Jul. 6-9, 1997, pp. 74-81).

Oberman et al., "AMD 3DNow! Technology and the K6-2 Microprocessor" (presentation), Proceeding Notebook for Hot Chips 10, Aug. 16-18, 1998 (pp. 245-254).

IEEE Standard for Binary Floating-Point Arithmetic.

TMS32010 User's Guide, Texas Instruments, 1983, p. 1183.

AltiVec™ Technology Programming Environments manual, Preliminary REV 0.2, May 1998, pp. 4-16 thru 4-19 (4 pages total).

Heinrich, Joe, MIPS R4000 Microprocessor User's manual, Second Edition, MIPS Technologies, 1994, pp. 154-155, 157, 159, 161, 168, 170-171, B-13, B17, B-19, B-21, B-23, B-27, B-38, B-40 and B-62 (19 pages total). Note: The page count of this document was cited to us as listed here in an International Search Report from a MIPS PCT Application.

3DNow!™ Technology manual, Advanced Micro Devices, 1998, pp/ i-x and 1-62 (72 pages total).

Higakl et al., A 2.5 GFLOPS 6.5 Million Polygons Per Second 4-Way VLIW Geometry Processor With SIMD Instructions And A Software Bypass Mechanism, Nakahara-ku, Kawasaki, Japan.

Higaki et al., Four-Way VLIW Geometry Processor for 3D Graphics Applications, Dec. 1, 1999, p. 39-47.

* cited by examiner $$\underbrace{\pm 1}_{310} . \underbrace{x\,x\,x\,-\,-\,x\,x}_{312} \cdot 2^{\overbrace{exp}^{314}}$$
FIG. 3A
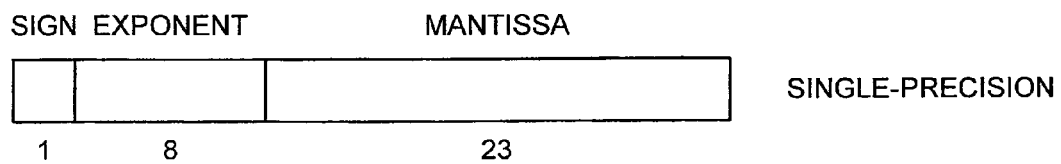
SINGLE-PRECISION
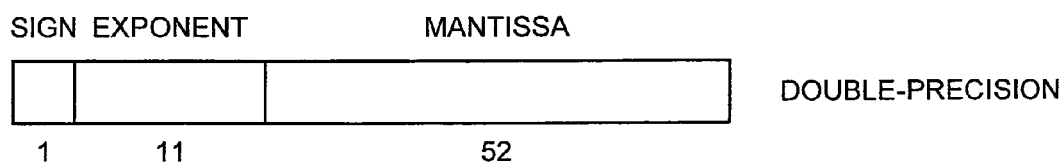
DOUBLE-PRECISION
FIG. 3B
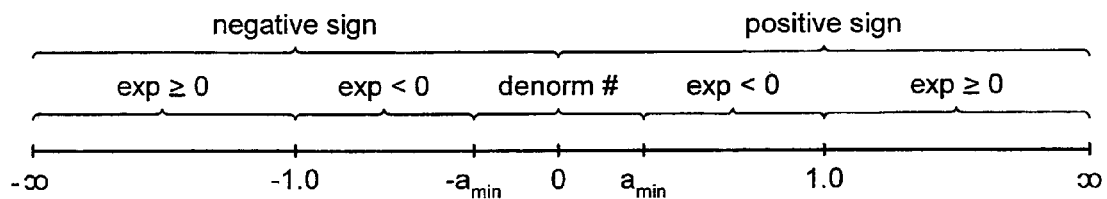
FIG. 4A

| EXPONENT | MANTISSA | |
|---|---|---|
| 1 1 1 ... 1 1 0 | 1 1 1 ... 1 1 1 | largest normalized # ($a_{max}$) |
| 1 1 1 ... 1 1 0 | 1 1 1 ... 1 1 0 | |
| 1 1 1 ... 1 1 0 | 0 0 0 ... 0 0 0 | |
| 1 1 1 ... 1 0 1 | 1 1 1 ... 1 1 1 | |
| 0 1 1 ... 1 1 1 | 0 0 0 ... 0 0 0 | smallest # > 1.0 |
| 0 1 1 ... 1 1 0 | 1 1 1 ... 1 1 1 | largest # < 1.0 |
| 0 0 0 ... 0 0 1 | 0 0 0 ... 0 0 1 | |
| 0 0 0 ... 0 0 1 | 0 0 0 ... 0 0 0 | smallest normalized # ($a_{min}$) |

| EXPONENT | MANTISSA | |
|---|---|---|
| 0 0 0 ... 0 0 0 | 1 1 1 ... 1 1 1 | |
| 0 0 0 ... 0 0 0 | 1 1 1 ... 1 1 0 | |
| 0 0 0 ... 0 0 0 | 1 0 0 ... 0 0 0 | denormalized numbers |
| 0 0 0 ... 0 0 0 | 0 1 1 ... 1 1 1 | |
| 0 0 0 ... 0 0 0 | 0 0 0 ... 0 0 1 | |
| 0 0 0 ... 0 0 0 | 0 0 0 ... 0 0 0 | zero (0.0) |

PROCESSOR WITH IMPROVED ACCURACY FOR MULTIPLY-ADD OPERATIONS

CROSS-REFERENCES TO RELATED APPLICATIONS

The following related patent applications filed on the same day herewith are hereby incorporated by reference in their entirety for all purposes:

U.S. patent application Ser. No. 09/364,512, entitled "Floating-Point Processor with Improved Intermediate Result Handling," by John Kelley and Ying-wai Ho;

U.S. patent application Ser. No. 09/363,638, entitled "Method and Apparatus for Predicting Floating-Point Exceptions," by James Jiang, Ying-wai Ho, and John Kelley;

U.S. patent application Ser. No. 09/363,637, entitled "System and Method for Improving the Accuracy of Reciprocal and Reciprocal Square Root Operations Performed by a Floating-Point Unit," by Ying-wai Ho, Michael Schulte, and John Kelley;

U.S. patent application Ser. No. 09/364,786, entitled "Processor Having a Compare Extension of an Instruction Set Architecture," by Radhika Thekkath, Michael Uhler, Ying-wai Ho, and Chandlee Harrell;

U.S. patent application Ser. No. 09/364,789, entitled "Processor Having a Conditional Branch Extension of an Instruction Set Architecture," by Radhika Thekkath, Michael Uhler, Ying-wai Ho, and Chandlee Harrell; and U.S. patent application Ser. No. 09/364,787, entitled "Processor Having an Arithmetic Extension of an Instruction Set Architecture," by Radhika Thekkath, Michael Uhler, Ying-wai Ho, and Chandlee Harrell.

BACKGROUND OF THE INVENTION

The present invention relates to floating-point processors, and more particularly to floating-point processors having improved accuracy for multiply-add (Madd) operations.

In digital processing systems, numerical data is typically expressed using integer or floating-point representation. Floating-point representation is preferred in many applications because of its ability to express a wide range of values and its ease of manipulation for some specified operations. A floating-point representation typically includes three components: a sign bit (sign), a mantissa (mant) that is sometimes referred to as a significand, and an exponent (exp). The represented floating-point number can be expressed as $(-1)^{sign} \cdot \text{mant} \cdot 2^{exp}$. Floating-point representations are also defined by "IEEE Standard for Binary Floating-Point Arithmetic," which is referred to herein as the IEEE-754 standard (or simply the IEEE standard) and incorporated herein by reference in its entirety for all purposes.

Many operations can be performed on floating-point numbers, including arithmetic operations such as addition, subtraction, and multiplication. For arithmetic operations, the IEEE standard provides guidelines to be followed to generate a unique answer for each floating-point operation. In particular, the IEEE standard describes the processing to be performed on the result from a particular operation (e.g., multiply, add), the precision of the resultant output, and the data format to be used. For example, the IEEE standard defines several rounding modes available for the results from add and multiply operations, and the bit position at which the rounding is to be performed. The requirements ensure identical results from different implementations of IEEE-compliant floating-point processors.

Many applications perform multiplication on two operands and addition (or subtraction) of the resultant product with a third operand. This multiply-add (or Madd) operation is common, for example, in digital signal processing where it is often used for computing filter functions, convolution, correlation, matrix transformations, and other functions. The Madd operation is also commonly used in geometric computation for (3-D) graphics applications.

Conventionally, a Madd operation can be achieved by sequentially performing a multiply (MUL) operation followed by an add (ADD) operation. Performing the operations sequentially results in long processing delay. Improved performance can often be obtained by performing the Madd operation using a specially designed unit that also supports conventional floating-point multiplication and addition.

For Madd operations, post-processing is typically performed on the intermediate result from the multiply portion. To obtain a final Madd output that fulfills IEEE rounding requirement, the post-processing includes possible denormalization and rounding of the intermediate result in accordance with one of the rounding modes defined by the IEEE standard. Denormalization is performed on a denormalized number (i.e., a non-zero number between the smallest positive representable normalized number, $+a_{min}$, and the smallest negative representable normalized number, $-a_{min}$) to place the denormalized number in a proper format such that rounding can be performed at the bit location specified by the IEEE standard. The post-processing (or more specifically, the denormalization and rounding) to generate an IEEE-compliant Madd result typically lead to reduced accuracy (since some bits may be discarded during the denormalization and rounding), increased hardware complexity, and increased processing time. To reduce hardware complexity and improve processing time, some Madd architectures provide an additional operating mode in which numbers (e.g., intermediate results) smaller than the smallest representable normalized number are set or flushed to zero, or some other values such as $a_{min}$. However, the flush-to-zero mode suffers from a higher loss in accuracy since the mantissa is replace with zero or some other predefined minimum value.

Accordingly, for Madd operations, techniques that increase the accuracy of the output result, simplify the post-processing of the intermediate result, and reduce the overall processing time are highly desirable.

SUMMARY OF THE INVENTION

The invention provides a floating-point processors capable of performing multiply-add (Madd) operations and having improved accuracy, reduced circuit complexity, and possibly enhanced operating speed. Improved performance is achieved by processing the intermediate result from the multiplier unit, when operating in a specified operating mode, in a particular manner. Specifically, the intermediate result is rounded but not normalized or denormalized, as described in detail below.

An embodiment of the invention provides a floating-point unit (FPU) configurable to perform multiply-add (Madd) operations. The FPU includes a multiplier unit coupled to an adder unit. The multiplier unit receives and multiplies the mantissas for the first and second operands to generate a multiplier output mantissa. The multiplier unit is configurable to operate in a first operating mode defined by the multiplier output mantissa being rounded and having a pseudo-normalized format. The adder unit couples to the multiplier unit and receives and combines the multiplier output mantissa and a mantissa for a third operand to generate a FPU output mantissa.

In an embodiment, the pseudo-normalized format is characterized by at least one bit to the left of a binary point having a value of one. The multiplier output mantissa can be rounded at a bit position defined by IEEE standard, and can also be rounded without regard to its associated exponent.

The multiplier unit can be designed to selectively operate in one of a number of operating modes. Besides the first operating mode described above, a second operating mode can be defined by the multiplier output mantissa being in conformance with the IEEE standard. In this mode, the multiplier output mantissa is normalized or denormalized, as necessary, and rounded in accordance with the IEEE standard. A third operating mode can be defined by the multiplier output mantissa being flushed to zero or other predefined values when a denormalized multiplier output is detected. The operating mode can be selected by a value stored in a control register, a control signal, or some other mechanisms.

The FPU can provide improved performance when configured to execute a set of operations designed to approximate a reciprocal of a number or a reciprocal square root of a number. These approximation can be performed in accordance with a Newton-Raphson algorithm.

Yet another embodiment of the invention provides a floating-point processor configurable to perform Madd operations. The floating-point processor includes a multiplier unit coupled to an adder unit. The multiplier unit includes a multiplier array operatively coupled to a first rounding unit. The multiplier array receives and multiplies mantissas for two operands. The first rounding unit is configurable to round an output from the multiplier array to generate a rounded multiplier output mantissa having a pseudo-normalized format. The adder unit includes a carry propagation adder (CPA), a second rounding unit, and a normalization unit. The CPA receives and combines the multiplier output mantissa and a mantissa for a third operand. The second rounding unit couples to the CPA and receives and rounds the mantissa from the CPA. The normalization unit couples to the second rounding unit and receives and normalizes the rounded mantissa. Within the multiplier unit, another CPA can be coupled between the multiplier array and the first rounding unit, to receive and combine a sum output and a carry output from the multiplier array.

The FPU and floating-point processor described above typically include additional units to process the exponents for the operands. The FPU and floating-point processor can be incorporated within a microprocessor or other hardware structure, and can also be described and/or implemented using hardware design languages (e.g., Verilog).

Yet another embodiment of the invention provides a method for performing a floating-point Madd operation. In accordance with the method, the mantissas for two operands are multiplied to generate a third mantissa, which is then rounded to generate a fourth mantissa. The fourth mantissa has a pseudo-normalized format and a range greater than a normalized mantissa. The fourth mantissa is combined with a mantissa for a third operand to generate an output mantissa. The output mantissa can further be rounded and normalized to generate a representation that conforms to the IEEE standard.

The invention also provides computer program products that implement the embodiments described above.

The foregoing, together with other aspects of this invention, will become more apparent when referring to the following specification, claims, and accompanying drawings.

BRIEF DESCRIPTION OF THE DRAWINGS

FIG. 3A shows a representation of a floating-point number;

FIG. 3B shows representations for single and double-precision floating-point numbers as defined by the IEEE standard;

FIG. 4A shows a diagram of a line that graphically represents all real numbers;

FIG. 6A shows two mantissa representations that can result from a multiply operation;

FIG. 6B shows a representation of a normalized but unrounded mantissa;

FIG. 6C shows a representation of a normalized mantissa that conforms to the IEEE standard;

FIG. 7A shows two mantissa representations for the mantissa from a carry propagation adder (CPA) within a multiplier unit of the FPU in FIG. 2;

FIG. 7B shows two mantissa representations for the mantissa from the rounding unit within the multiplier unit; and FIG. 8 shows a representation of a floating-point control status register ("FCSR") configured to store bits identifying a particular operating mode.

DESCRIPTION OF THE SPECIFIC EMBODIMENTS

Figure 1:
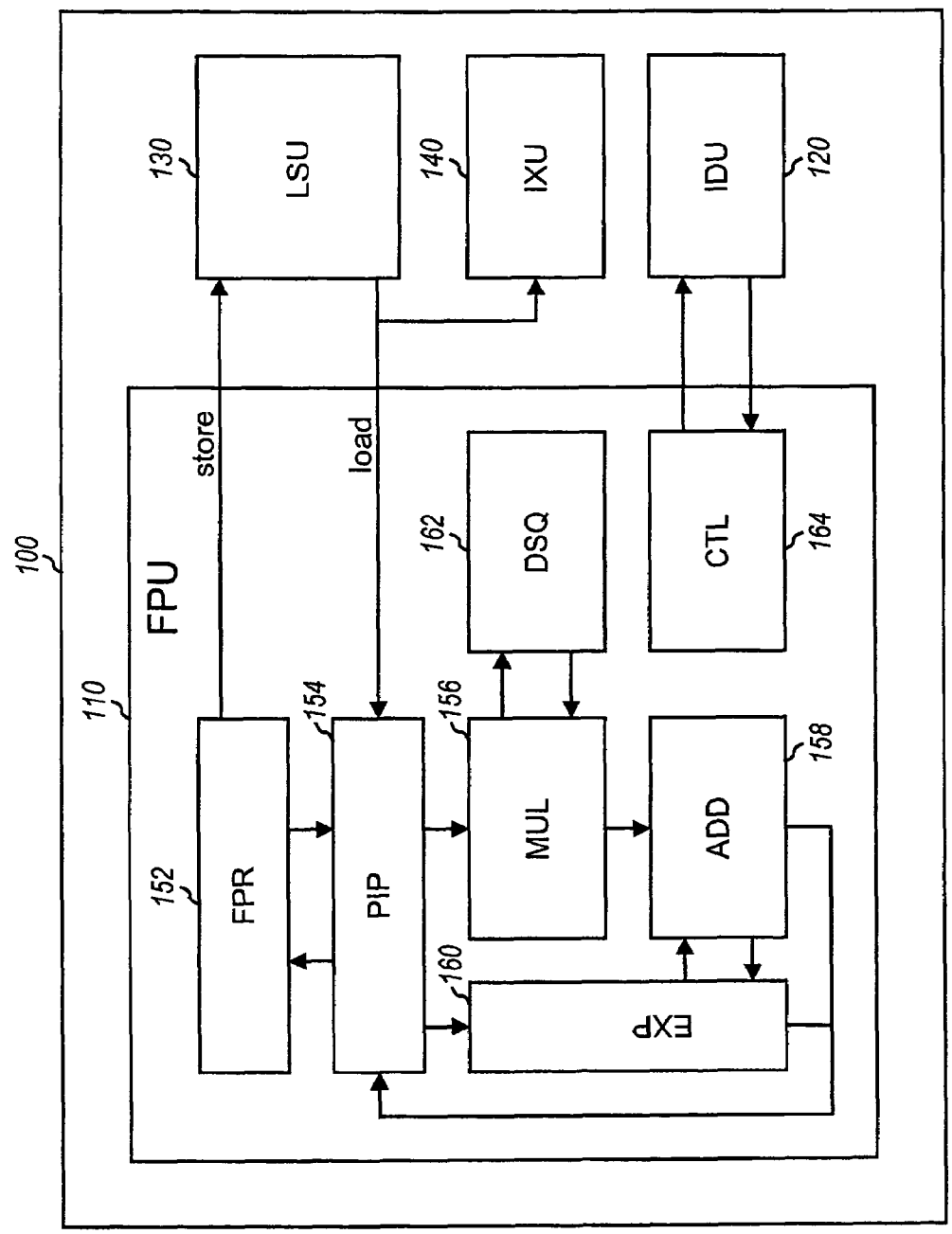
FIG. 1 shows a simplified diagram of an embodiment of a processor that incorporates a floating-point unit (FPU) of the invention.

FIG. 1 shows a simplified diagram of an embodiment of a processor 100 that incorporates a floating-point unit (FPU) 110 of the invention. As shown in the specific embodiment in FIG. 1, processor 100 further includes an instruction dispatch unit (IDU) 120, a load store unit (LSU) 130, and an integer execution unit (IXU) 140. IDU 120 decodes a sequence of instructions, dispatches floating-point instructions to FPU 110, and keeps track of the state of each dispatched floating-point instruction, resource and register dependencies, and the possibility of bypassing a resultant operand to the next FPU instruction. FPU 110 performs floating-point computations, as directed by IDU 120. LSU 130 interfaces with other elements (i.e., internal or external to processor 100) and provides data to, and receives data from FPU 110. For example, operands are loaded from LSU 130 to FPU 110 and results are provided from FPU 110 to LSU 130. IXU 140 performs integer computations, and is able to transfer data to, and receive data from FPU 110.

FIG. 1 also shows a block diagram of an embodiment of FPU 110. FPU 110 includes a floating-point register file (FPR) 152 that interfaces with LSU 130. FPR 152 includes a number of read ports (i.e., for reading up to three operands for each arithmetic operation and one operand for a store operation) and a number of write ports (i.e., for writing one operand for each arithmetic and load operation).

A floating-point pipe file (PIP) 154 couples to FPR 152 and further interfaces with LSU 130 and IXU 140. For each instruction, PIP 154 selects and receives operands from FPR 152, a load pipe file, a result pipe file, or a ROM. PIP 154 then unpacks the received operands (i.e., from an IEEE-compliant format) into an internal data format recognized by the processing units within FPU 110. PIP 154 also packs the results from FPU 110 into a data format (i.e., IEEE-compliant format) required by the external circuitry and provides the packed results to FPR 152.

A floating-point multiplier (MUL) 156 couples to PIP 154 and executes floating-point multiply instructions as well as the multiply portion of compound instructions such as a multiply-add (MADD) instruction. MUL 156 receives the mantissas of two operands from PIP 154. In an embodiment, MUL 156 is implemented with a multiplier array that generates a set of sum and carry outputs having full precision. The sum and carry are provided to, and combined in a carry-propagate adder (CPA) to generate a precise, unrounded resultant mantissa. The lower bits of the resultant mantissa are logically combined to form a "sticky" bit that, in combination with the round bit and the current rounding mode, are used to generate rounding information to be sent to a subsequent rounding unit within MUL 156. MUL 156 is described in further detail below.

A floating-point adder (ADD) 158 couples to PIP 154 and MUL 156. ADD 158 executes floating-point add and subtract instructions as well as the add portion of compound instructions such as MADD. ADD 158 receives two operands and performs floating-point magnitude addition/subtraction using, for example, a prescale adder (PSA) operated in parallel with a massive cancellation adder (MCA). The final output is selected from one of the adders and provided to PIP 154 for storage. In one embodiment, adder selection is based upon the exponent difference of the subject operands and the first few bits of the mantissas of such operands (i.e., the integer bit(s) and the most significant bit of the fractional portion) so that: (1) the PSA is always used for addition and selectively used for subtraction when the result is guaranteed to be no less than 0.1000000 before rounding and normalization and (2) the MCA is selectively used for subtraction when the result is guaranteed to be less than 1.0 and may have a large number of leading zeros before rounding and normalization. Operands that satisfy both conditions may be processed by either the PSA or MCA. Often, this selection criteria results in selection of the PSA for additions and subtractions when the difference between operand exponents is greater than two, and the selection of the MCA for subtractions when the difference between operand exponents is less than or equal to two.

A floating-point exponent unit (EXP) 160 couples to PIP 154 and ADD 158. EXP 160 receives the exponents of the operands from PIP 154, estimates an output exponent based on the operation being performed and the exponents of the operands, and adjusts the estimated output exponent based on the rounding and normalization performed on the mantissa (e.g., by MUL 156 and ADD 158). EXP 160 also performs other functions, such as overflow/underflow prediction and checks.

A floating-point divide/square-root unit (DSQ) 162 couples to MUL 156 and operates on the mantissas for divide and square-root instructions. DSQ 162 is designed to implement a particular algorithm (e.g., a radix-2 SRT or a radix-4 SRT algorithm).

A floating-point control unit (CTL) 164 is the control unit for FPU 110. CTL 164 receives floating-point instructions and directs the operation of various units within FPU 110 to generate the proper output.

Figure 2:
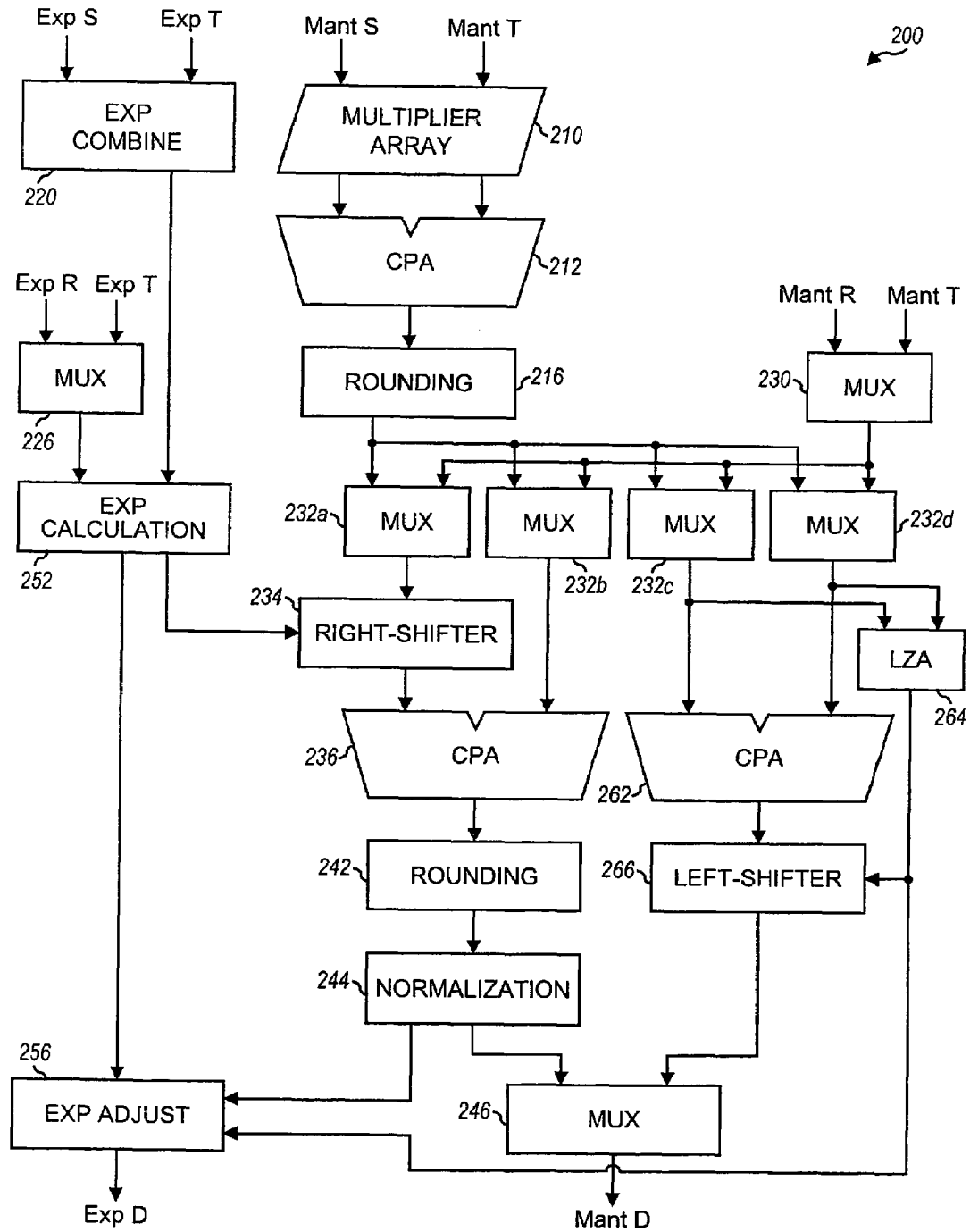
FIG. 2 shows a block diagram of an embodiment of a FPU capable of performing add, multiply, and multiply-add operations in accordance with the invention.

FIG. 2 shows a block diagram of an embodiment of a floating-point unit (FPU) 200 capable of performing add, multiply, and multiply-add (Madd) operations. FPU 200 represents a portion of FPU 110 shown in FIG. 1. FPU 200 includes a multiplier unit coupled to an adder unit. Support circuitry, such as that shown in FIG. 1, is not shown in FIG. 2 for simplicity. The multiplier unit includes a multiplier array 210, a carry-propagation adder (CPA) 212, a rounding unit 216, and an exponent combine unit 220. The adder unit includes the remaining units shown in FIG. 2. FPU 200 includes several features that increase accuracy, simplify the hardware design, and improve operational performance, as described below.

At any given moment, FPU 200 can be configured to perform one of at least three different operations including addition, multiplication, and Madd. These operations are expressed by the following:

$$Fd=Fs\pm Ft,$$

$$Fd=Fs\cdot Ft, \text{ and}$$

$$Fd=\pm((Fs\cdot Ft)\pm Fr),$$

where Fd is the resultant output and Fr, Fs, and Ft are three input operands. The Madd operation can be further decomposed into the following operations and their corresponding names:

$$Fd=(Fs\cdot Ft)+Fr, \text{ MADD}$$

$$Fd=(Fs\cdot Ft)-Fr, \text{ MSUB}$$

$$Fd=-((Fs\cdot Ft)+Fr), \text{ N MADD}$$

$$Fd=-((Fs\cdot Ft)-Fr), \text{ N MSUB},$$

As shown in FIG. 2, the mantissas, Mant S and Mant T, for two operands are provided to multiplier array 210. Array 210 can implement, for example, a Booth or modified Booth algorithm, and can include partial product generation logic and a number of carry-save adders. The partial product generation logic produces partial products based on the mantissas. The carry-save adders add a number of partial products together and send the outputs to other carry-save adders in a tree-like fashion until only two numbers are left, the final sum and carry. In a specific implementation, the carry-save adders take in four terms and combine them into two, but other configurations are possible.

Array 210 thus multiplies the two operands and provides the product in sum-and-carry format to CPA 212. CPA 212 combines the sum and carry and provides the resultant mantissa to rounding unit 216 that processes the mantissa based on a specified operating mode of the FPU. The operation of rounding unit 216 is further described below. The processed mantissa comprises the output mantissa from the multiplier unit.

The exponents, Exp S and Exp T, of the two operands are provided to exponent combination unit 220 that combines the exponents for a multiply operation. The combined exponent from unit 220 comprises the output exponent from the multiplier unit.

In an embodiment, for improved performance (i.e., faster operating speed), the adder unit includes a prescale adder (PSA) and a massive cancellation adder (MCA) operated in parallel. Depending on the characteristics of the operands, the output from either the PSA or MCA is selected.

To perform a floating-point addition, the mantissas of the two operands are typically aligned by shifting one of the mantissa and adjusting its exponent until the exponents of the two operands are equal. The mantissas are then combined (e.g., added or subtracted), and the resultant mantissa is normalized. The number of shifts prior to the combination can be large (e.g., when adding a large number with a small number), and the number of shifts after the combination can also be large (e.g., when subtracting two operands having similar magnitudes). The PSA and MCA are designed to efficiently process most input conditions, including these two extreme conditions.

For the PSA, the mantissa from rounding unit 216 is provided to MUXes 232a and 232b. The mantissas for operands R and T are provided to a MUX 230 that selects one of the mantissas, based on the operation to be performed, and provides the selected mantissa to MUXes 232a and 232b. MUX 232a selects the mantissa of the smaller operand and provides the selected mantissa to a right-shift unit 234. MUX 232b selects the mantissa of the larger operand and provides the selected mantissa to a CPA 236.

The exponents of operands R and T are provided to a MUX 226 that selects one of the exponents based on the operation to be performed. The selected exponent from MUX 226 and the combined exponent from unit 220 are provided to an exponent calculation unit 252 that determines the difference between the two exponents and a preliminary result exponent. Determination of the preliminary result exponent is dependent upon the arithmetic equation being performed, and is further described in the aforementioned U.S. patent application Ser. No. 09/363,638. The preliminary result exponent (e.g., the larger exponent when performing an add operation) is provided to an exponent adjustment unit 256 and the exponent difference is provided to right-shift unit 234 that shifts the mantissa of the smaller operand to the right by the indicated exponent difference. The shifted mantissa is provided to CPA 236 that combines the two mantissas and provides a combined mantissa to a rounding unit 242. Rounding unit 242 rounds the combined mantissa and provides the rounded mantissa to a normalization unit 244.

The mantissa from CPA 236 can be in the 01.xxx--xxxx, 1x.xxx--xxxx, or 0.1xxx--xxxx (from subtraction) format. Normalization unit 244 normalizes the result to the 01.xxx--xx format by performing a 1-bit right-shift or left-shift, if necessary. The exponent is adjusted by exponent adjustment unit 256, as necessary, based on the normalization performed by normalization unit 244.

The MCA portion of FPU 200 includes a CPA 262, a leading zero anticipator (LZA) 264, and a left-shift unit 266. For the MCA, the mantissas from rounding unit 216 and MUX 230 are provided to MUxes 232c and 232d. MUXes 232 facilitate a small shift of one of the mantissas, based on the exponent difference, to align the mantissas. MUXes 232 are also used to select one of the mantissas for inversion in subtraction operations (the inverter is not shown in FIG. 2 for simplicity). The outputs from MUXes 232c and 232d are provided to CPA 262 and LZA 264. CPA 262 combines the two mantissas and provides a combined mantissa to left-shift unit 266. LZA 264 anticipates the number of leading zeros in the resultant mantissa, based on the input operands. The output from LZA 264 is encoded into a control signal that defines the number of shifts for left-shift unit 266. The control signal is also provided to exponent adjust 256 to adjust the exponent.

The outputs from normalization unit 244 and left-shift unit 266 are provided to a MUX 246 that selects the output from the PSA or MCA as the output mantissa from FPU 200. The adjusted exponent from unit 256 comprises the output exponent from FPU 200. The operation of FPU 200 is further described in the aforementioned U.S. patent application Ser. No. 09/364,514.

FIG. 2 shows a Madd architecture in which two rounding operations can be performed, one after the multiply operation and the other after the add operation. This Madd architecture can generate Madd results that fulfill the IEEE rounding requirements, as if the multiply and add were executed separately.

FIG. 3A shows a representation of a normalized floating-point number. The representation includes a sign bit 310, a mantissa 312, and an exponent 314. A normalized floating-point number is represented by a mantissa having a one (1) to the left of the binary point (i.e., the integer portion of the mantissa) and a 1.xxx--xx format, where each "x" represents one bit that is either a one or a zero. As defined by the IEEE standard, the fractional portion "xxx--xx" represents 23 bits after the binary point for normalized single precision numbers and 52 bits for normalized double precision numbers. The normalized mantissa has a range of between 1.0 and 2.0 (i.e., $1.0 \leq \text{mantissa} < 2.0$).

The IEEE standard defines the representation for floating-point numbers. For normalized numbers, the IEEE standard mandates storing only the fractional portion of the mantissa (i.e., the "xxx--xx" portion in FIG. 3A). The leading one (1) to the left of the binary point is implicit and not stored.

FIG. 3B shows representations for single and double-precision floating-point numbers as defined by the IEEE standard. The IEEE standard defines the number of bits to be used for the exponent and for the fractional portion of the mantissa, for single (32-bit) and double (64-bit) precision floating-point numbers. As shown in FIG. 3B, the single-precision representation includes three components: a single sign bit (sign), an 8-bit exponent (exp), and a 23-bit mantissa (mant). The double-precision representation includes a single sign bit (sign), an 11-bit exponent (exp), and a 52-bit mantissa (mant). A floating-point number (y) can be expressed as:

$$y = (-1)^{sign} \cdot \text{mant} \cdot 2^{exp}. \qquad \text{Eq. (1)}$$

FIG. 4A shows a diagram of a line that graphically represents all real numbers. It should be noted that this line representation is not drawn to scale. Generally, real numbers range from negative infinity ($-\infty$) to positive infinity ($+\infty$). In the line representation shown in FIG. 4A and for the floating-point expression shown in equation (1), numbers greater than 0.0 (i.e., y>0.0) are represented by a positive sign bit (i.e., sign=0) and numbers less than 0.0 (i.e., y<0.0) are represented by a negative sign bit (i.e., sign=1). Numbers having an absolute value greater than 1.0 (i.e., |y|>1.0) are represented by a positive exponent (i.e., exp$\geq$0) and numbers having an absolute value less than 1.0 (i.e., |y|<1.0) are represented by a negative exponent (i.e., exp<0).

For floating-point representations having finite resolution (such as those shown in FIG. 3B with 32 bits for single-precision and 64 bits for double-precision), only numbers within a particular range of values can be represented as normalized number using the expression shown in equation (1). This range is defined by a maximum normalized value $a_{max}$ and a minimum normalized value $a_{min}$. For single-precision numbers, $a_{max}$ is slightly smaller than $2^{+128}$ and $a_{min}=2^{-126}$. Some numbers between zero and the minimum normalized value (i.e., $a_{min}>y>0.0$) can be represented as denormalized numbers, which are described below. Special representations are used for zero (0.0) and for some numbers greater than the maximum normalized value (e.g., infinity).

Figures 4B, 5A, 5B:
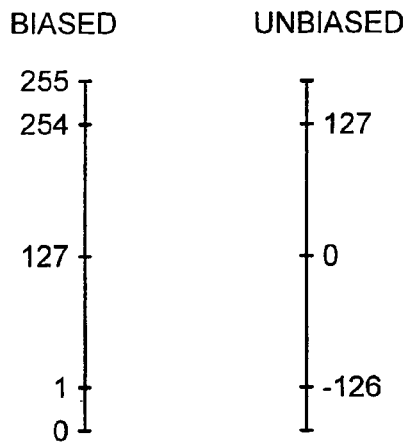
FIG. 4B shows a diagram of an exponent representation for single-precision numbers in accordance with the IEEE standard.
FIG. 5A shows the representations for some normalized numbers.
FIG. 5B shows the representations for some denormalized numbers and for zero (0)

FIG. 4B shows a diagram of an exponent representation for single-precision numbers in accordance with the IEEE standard. To obtain both positive and negative exponent values with a binary representation, the represented exponent is offset with a bias value. For single-precision numbers, the IEEE standard defines the exponent bias value to be 127. Thus, the actual (i.e., unbiased) exponent value is equal to the represented (i.e., biased) exponent value (i.e., as stored in the exponent portion shown in FIG. 3B) minus the exponent bias value of 127. For example, the biased exponent values of 254, 127, and 1 correspond to the unbiased exponent values of +127, 0, and −126, respectively. In accordance with IEEE standard, exponent values of all ones (e.g., 255) and all zeros (e.g., 0) are used to represent special cases, as described below. Thus, normalized numbers that can be represented have exponents within the range of +127 to −126.

FIG. 5A shows the representations for some normalized numbers. As noted above, a normalized number has a mantissa that conforms to the 1.xxx--xx format, where the bit to the left of the binary point is a one (1) and each "x" to the right of the binary point represents a single bit that can be either a one (1) or a zero (0). Generally, a normalized number has a biased exponent that is within the defined range (e.g., between 254 to 1 for single-precision, which corresponds to a biased exponents of +127 to −126, respectively). The biased exponent value of 0 is reserved for representing zero (i.e., y=0.0) and denormalized numbers, as described below.

The largest normalized number (i.e., $a_{max}$) has a biased exponent of 111 . . . 110 (corresponding to an unbiased exponent of +127 for single-precision) and a mantissa of all ones (corresponding to a mantissa value of 1.111 . . . 11, since a "1" to the left of the binary point is implicit for a normalized number). It should be noted that the all ones exponent is reserved for special representations. The next largest number that can be represented has the same exponent value (e.g., unbiased exponent of +127 for single-precision) and a mantissa value that is one least significant bit (LSB) less than that of the largest normalized number (i.e., 1.111 . . . 10). Generally, for decreasingly smaller numbers, the fractional part of the mantissa is decremented by one from all ones to all zeros. When the fractional part is all zeros, the next smaller number is expressed by resetting the fractional part back to all ones and decrementing the exponent value by one. This process continues until the smallest value is reached, which is represented by an exponent of 000 . . . 001 and a fractional part of all zeros.

FIG. 5B shows the representations for some denormalized numbers and for zero. As noted above, a zero real number (i.e., y=0.0) is represented by an all-zero exponent and an all-zero mantissa. To extend the range of numbers that can be represented, the IEEE standard defines the representation of denormalized numbers using the all-zero exponent and non-zero mantissas. The denormalized mantissa has a format of 0.xxx--xx, where the bit to the left of the binary point is a zero (0) and each "x" to the right of the binary point is either a one (1) or a zero (0). The largest denormalized number has a mantissa value of 0.111 . . . 11 (corresponding to a number slightly smaller than $2^{-126}$ for single-precision) and the smallest denormalized number has a mantissa value of 0.000 . . . 01 (i.e., corresponding to $2^{-149}$, for single-precision). Thus, the denormalized numbers cover a range between the minimum normalized number $a_{min}$ and zero (i.e., a range of $2^{-126}$ to $2^{-149}$ for single-precision).

Denormalized numbers extend the range of representable numbers, as indicated in the line representation in FIG. 4A, but are generally more difficult to handle in the FPU because extra processing is required to manipulate the exponent and mantissa. To facilitate handling and to simplify processing of denormalized numbers, the FPU is typically designed with additional resolution to allow for representation of IEEE-compliant denormalized numbers using internal normalized representations. For example, by increasing the exponent by one additional bit, the resolution is greatly increased and denormalized numbers can be normalized using the internal representation prior to processing. As a specific example, for single-precision, a 9-bit exponent having an unbiased exponent range of +255 to −254 can easily present the smallest IEEE denormalized number of $2^{-149}$.

Typically, numbers are stored in memory or storage in accordance with the IEEE format. As such, these numbers can be normalized numbers, denormalized numbers, or special numbers (e.g., zero and infinity). For many FPU architectures, numbers are retrieved from storage and, prior to processing by the FPU, are "unpacked" into internal normalized representations. The resultant output from the FPU may be "packed" back into the IEEE format prior to being transferred back to storage.

The IEEE standard defines guidelines to be followed to generate unique results for floating-point operations such as addition and multiplication. The IEEE standard does not define the processing for a Madd operation, which is basically a concatenation of a multiplication followed by an addition. To generate a Madd result that is IEEE-compliant, the intermediate result from the multiply portion of the Madd operation needs to be processed to generate an IEEE-compliant intermediate result that is identical to a result from an IEEE multiply operation.

FIG. 6A shows two mantissa representations that can result from a multiply operation. When performing multiplication of two normalized mantissas (i.e., using internal representations), each being within the range of 1.0 and 2.0 (i.e., corresponding to the 1.xxx--xx format) and having N bits of precision, the resultant mantissa can range from 1.0 to 4.0 and have a 01.xxx--xxxx or 1x.xxx--xxxx format. The fractional portion "xxx--xxxx" represents up to 2N bits of precision for the unrounded multiplier result (or more than 23 bits for single precision and more than 52 bits for double precision numbers). Two bits to the left of the binary point are used to represent the range of 1.0 to 4.0. Normalization (e.g., a right-shift of one bit position) can be performed whenever the resultant operand is 2.0 or greater to maintain the mantissa within the range of 1.0 and 2.0. The exponent is adjusted accordingly whenever a shift is performed (i.e., by incrementing the exponent by one for each right shift by one bit position).

FIG. 6B shows a representation of a normalized but unrounded mantissa. Since the resultant mantissa from the multiplier array can have up to 2N bits of precision, rounding can be performed to provide a mantissa having N bits of precision, the same precision as that of the input mantissas. The IEEE standard defines the position of the bit to be rounded as well as the available rounding modes. Essentially, the mantissa is truncated to the right of a defined bit position indicated by an arrow 620, and possibly incremented at this bit position. The increment bit is generated based on a round bit, a "sticky" bit, and the current rounding mode. The round bit is the bit to the right of arrow 620, and the sticky bit is the OR of all bits to the right of the round bit. The rounding may generate a mantissa that requires re-normalization. When this occurs, a second normalization is performed.

FIG. 6C shows a representation of a normalized mantissa that conforms to the IEEE standard. The normalized mantissa has a range of 1.0 to 2.0 and N bits of precision.

The formats shown in FIGS. 6A through 6C can be deemed as variants of a "pseudo-normalized" format. As used herein, the pseudo-normalized format is defined by the presence of at least one bit having a value of one (1) located to the left of the binary point. Thus, the pseudo-normalized format includes 01.xxx--xx, 10.xxx--xx, 11.xxx--xx, and other formats. The pseudo-normalized format covers any number of binary digits to the right of the binary point.

As noted above, multiplication of two N-bit numbers results in a product having up to 2N bits of precision. Depending on the input operands, the product may exceed the maximum normalized value $a_{max}$ or may fall within the IEEE denormalized range. As part of the post-processing after the multiply operation, to generate an IEEE-compliant multiply result, a determination is made whether the intermediate result is a normalized or denormalized number. If the intermediate result is deemed to be a denormalized number, a denormalization followed by a rounding is performed in order to generate IEEE-compliant multiply result, which is the prerequisite for generating an IEEE-compliant Madd result.

Denormalization of the intermediate result can be performed as follows. First, the intermediate exponent associated with the intermediate result is checked to determine whether it is less than the minimum normalized exponent (e.g., less than −126 for single precision). This situation can occur when multiplying two small numbers, and the additional precision of the internal exponent representation can capture the small result. If the intermediate exponent is less than the minimum normalized exponent, the mantissa is shifted to the right and the exponent incremented by one with each bit of right-shift. The mantissa right-shift and exponent increment continue until the updated exponent is equal to the minimum normalized exponent. The mantissa is then rounded at the bit position indicated by the IEEE standard. Denormalization is necessary so that the rounding can be performed at the correct bit position as defined by the IEEE standard.

Denormalization of the intermediate result to generate an IEEE-compliant multiply result generally degrades accuracy because bits are thrown out during the denormalization process. Moreover, denormalization is a time consuming process that requires additional hardware to implement. Various approaches have been implemented to simplify the processing of denormalized number and to reduce the hardware requirement. Two of these approaches are described below.

In one approach, the FPU detects a denormalized number but the actual denormalization is performed by some other mechanisms (e.g., software). Detection of a denormalized number can be achieved using conventional techniques based upon exponent and mantissa values. Upon detection of a denormalized number, an exception occurs (i.e., a flag is raised) and corrective measures are carried out by software. The hardware detection and software processing approach can be applied to input operands as well as the intermediate result from the multiplier unit. This approach for handling denormalized numbers to generate an IEEE-compliant multiply result typically sacrifices performance (i.e., slower operating speed) for a more simplified hardware design.

In another approach, the FPU is designed with the capability to flush a denormalized number to zero. In one specific implementation of this "flush-to-zero" approach, if an operand is determined to be within the range of positive and negative minimum normalized number (i.e., between $+a_{min}$ and $-a_{min}$) it is set to zero (0.0). Other variants of the flush-to-zero approach can also be implemented. For example, in a round-to-positive-infinity rounding mode, the operand is flushed to the minimum normalized number $a_{min}$ if it is within the range of zero (0.0) and $a_{min}$, and flushed to zero (0.0) if it is within the range of $-a_{min}$ and zero (0.0). In a round-to-negative-infinity rounding mode, the operand is flushed to $-a_{min}$ if it is within the range of $-a_{min}$ and zero (0.0), and flushed to zero (0.0) if it is within the range of zero (0.0) and $a_{min}$. The flush-to-zero operation can be performed on denormalized input, intermediate, and output operands. This approach provides improved operating speed and requires minimal additional hardware to flush the intermediate result to zero. However, the Madd result is not IEEE-compliant and accuracy is degraded since bits are thrown out when the mantissa is flushed to zero or some other values.

Many applications do not require IEEE-compliant results from Madd operations. For these applications, the intermediate result from the multiply portion of a Madd operation can be flushed to zero, as described above. However, flushing the intermediate result to zero degrades the accuracy of the associated Madd result.

In accordance with the invention, a new approach is provided that causes rounding, but not normalization or denormalization, of the intermediate result from the multiply portion of the Madd operation. In this "Madd-flush-override" approach, the intermediate result is maintained in an internal normalized format to improve accuracy. This approach may be used exclusively or configured as one of several operating modes of a computer system. Each such operating mode may be identified, for example, by one or more bits held in a control register.

Figure 8:
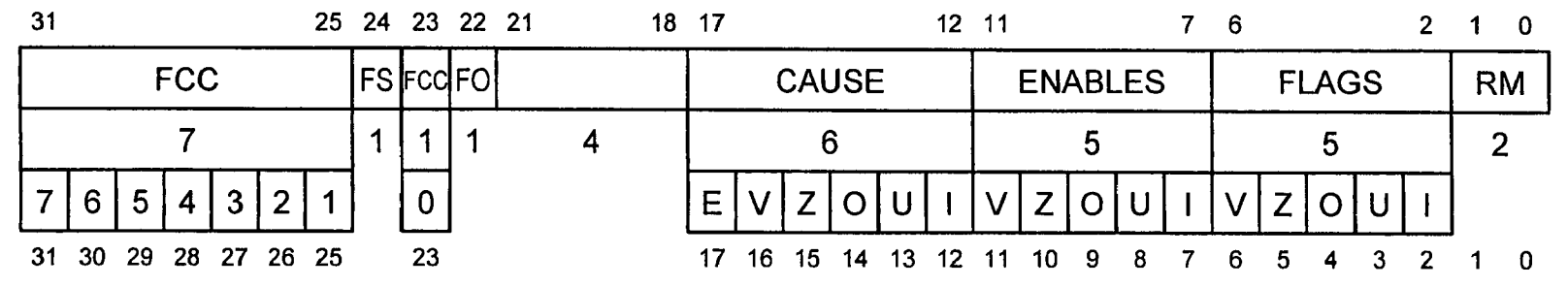

FIG. 8 shows a representation of a floating-point control status register ("FCSR") configured to store bits identifying a particular operating mode. The FCSR contains bit values that control the floating-point operations of the FPU. In a specific embodiment, the FCSR includes a flush ("FS") bit and a Madd-flush-override ("FO") bit located at bit positions 24 and 22, respectively, to specify IEEE-compliant, flush-to-zero, and Madd-flush-override modes. The flush-to-zero mode is activated when the FS bit is one (i.e., logic high), and the IEEE-compliant mode is activated when the FS bit is zero (i.e., logic low). When the FO bit is one, the Madd-flush-override mode is activated and a denormalized intermediate result of a Madd operation is not flushed nor denormalized according to the FS bit. The FCSR is further described in the aforementioned U.S. patent application Ser. No. 09/364,787.

Table 1 summarizes the operating modes and a designation for the FS and FO bits.

TABLE 1

Mode Definition

| MODE | FO | FS | Madd Intermediate Result Processing |
|---|---|---|---|
| IEEE-compliant | 0 | 0 | Process the intermediate result from the multiplier unit to generate IEEE-compliant intermediate |

TABLE 1-continued

Mode Definition

| MODE | FO | FS | Madd Intermediate Result Processing |
|---|---|---|---|
| | | | output. This processing includes normalization/ denormalization and rounding of the intermediate result. |
| Flush-to-zero | 0 | 1 | Flush the intermediate result to zero or some other predefined value if it is a denormalized number. |
| Madd-flush-override | 1 | X | Round Madd intermediate result in internal normalized format (also referred to herein as "pseudo-normalized" format); i.e., round but do not normalize/denormalize the intermediate result. |

Generally, the FPU can be designed to support any combination of the modes shown in Table 1 and other modes not listed. For example, the FPU can be designed to support only Madd-flush-override mode, IEEE-compliant and Madd-flush-override modes, all three modes listed in Table 1, or other mode combinations. In IEEE-compliant mode, the processing to generate the IEEE-compliant intermediate result can be performed in hardware, software, or a combination of both. The modes listed in Table 1 are described below.

In IEEE-compliant mode, the intermediate result from the multiplier unit in the FPU is normalized or denormalized, as necessary by hardware or software, and rounded. Referring to FIG. 6A, the intermediate result from CPA 212 can be in either the 01.xxx--xxxx or 1x.xxx--xxxx format. Initially, the exponent for the intermediate result is checked to determine whether the intermediate result is within the range of normalized or denormalized number. This can be achieved by comparing the exponent against the maximum exponent value $exp_{max}$ and the minimum exponent value $exp_{min}$ (e.g., $exp_{max}$=+127 and $exp_{min}$=–126 for single-precision). If the intermediate result is determined to be a normalized number, the mantissa is normalized to the 01.xxx--xxxx format. Alternatively, if the intermediate result is determined to be a denormalized number, the mantissa is denormalized in the manner described above. The normalized or denormalized mantissa is then rounded at the position indicated by arrow 620 in FIG. 6B. The normalized/denormalized and rounded intermediate result is provided to the adder unit.

In Flush-to-zero mode, the mantissa from the multiplier unit in the FPU is flushed to zero if the intermediate result is a denormalized number. Again, this determination can be achieved by checking the exponent for the intermediate result and the mantissa value. Specifically, if the exponent is less than $exp_{min}$ and the mantissa is not equal to zero (e.g., mant≠0), the intermediate result is deemed to be a denormalized number and flushed to zero.

In Madd-flush-override mode, the intermediate result from the multiplier unit is rounded but not normalized or denormalized. In an embodiment, the rounding is performed without checking the exponent associated with the intermediate result. In an embodiment, the mantissa from rounding unit 216 is rounded regardless of whether it is a denormalized number or a number within the range defined by $a_{max}$ and $a_{min}$.

FIG. 7A shows two mantissa representations for the mantissa from CPA 212 in the multiplier unit. The output from multiplier array 210 can have up to 2N bits of precision to the right of the binary point and two bits of precision to the left of the binary point. Rounding unit 216 initially determines whether the bit in the most significant bit (MSB) position 708 is a zero (0) or a one (1). The position of the bit to be rounded differs by one bit position depending on whether the mantissa has the 01.xxx--xxxx or 1x.xxx--xxxx format. For a mantissa having the 01.xxx--xxxx format, rounding unit 216 rounds the bit at the position indicated by an arrow 710a. Alternatively, for a mantissa having the 1x.xxx--xxxx format, rounding unit 216 rounds the bit at the position indicated by an arrow 710b.

FIG. 7B shows two mantissa representations for the mantissa from rounding unit 216. The rounded mantissa ranges between 1.0 and 4.0, which is approximately twice the range of a normalized mantissa. An additional bit is used to represent the additional range in the mantissa. The subsequent units (e.g., right-shift unit 234, CPA 236, rounding unit 242, and normalization unit 244 in the PSA, and CPA 262 and left-shift unit 266 in the MCA) are designed to properly process the additional bit in the mantissa.

Several advantages are obtained by performing rounding, but not normalization or denormalization, in accordance with MADD-flush-override mode. First, accuracy is improved since denormalization, which throws out bits, is not performed. In MADD-flush-override mode, the intermediate result is kept in internal normalized format to improve accuracy Second, some or all of the hardware can be designed with less than 2N bits of precision, since some of the precision is likely to be discarded in the rounding within the multiplier unit. For example, multiplier array 210 and CPA 212 can be implemented with less than 2N bits of precision. The subsequent units in the adder unit can also be designed to operate on number having less than 2N bits of precision, which again simplify the hardware design.

Third, implementation of these units with less precision can improve the operating speed of the FPU. As noted above, the multiplier array is typically implemented with a set of carry-save adders operated sequentially. Less processing delay, and therefore faster operating speed, may be obtain by calculating less than the full 2N bit result.

As noted above, floating-point processors capable of performing Madd operations are desirable in many applications, such as digital signal processing and graphics. Madd operations are also commonly used in arithmetic algorithms. For example, the Newton-Raphson algorithm is a convergent algorithm used for approximating reciprocals and reciprocal square roots. This algorithm performs many multiply and Madd operations. The performance of the algorithm (e.g., its speed of convergent and accuracy) is dependent on the accuracy of the Madd operation. Moreover, since the algorithm typically includes many Madd operations, the speed of the algorithm is also dependent on the speed of the Madd operation. A floating-point processor incorporating the invention can provide improved performance (i.e., accuracy and speed) when used to implement the Newton-Raphson algorithm.

The Newton-Raphson reciprocal algorithm for approximating the reciprocal of a number R is defined as:

$$\frac{1}{R} \cong X_{i+1} = X_i \cdot (2 - R \cdot X_i),$$

where i is an integer greater than one (i.e., i=1, 2, 3, . . . ), $X_i$ is an approximation from the i-th iteration, and $X_{i+1}$ is a more accurate approximation at the (i+1)-th iteration.

The Newton-Raphson reciprocal square root algorithm for approximating the reciprocal square root of a number (R) is defined as:

$$\frac{1}{\sqrt{R}} \cong X_{i+1} = \frac{(3 - R \cdot X_i \cdot X_i) \cdot X_i}{2},$$

where $X_i$ is an approximation of the reciprocal square root of the number R from the i-th iteration, and $X_{i+1}$ is a more accurate approximation at the (i+1)-th iteration.

The Newton-Raphson algorithm and its implementation using a floating-point processor is further described in the aforementioned U.S. patent application Ser. No. 09/363,637.

A floating-point instruction set architecture (ISA) for FPU 110 includes instructions for implementing the Newton-Raphson reciprocal and reciprocal square root algorithms. In one embodiment, the ISA includes three instructions for implementing an iteration of the Newton-Raphson reciprocal algorithm. The three instruction are: RECIP1 (operand1), RECIP2 (operand1, operand2), and MADD (operand1, operand2, operand3).

The RECIP1 (operand1) instruction enables FPU 110 to produce a result that is an estimate of the reciprocal of operand1. There are a variety of ways to produce the estimate. In one embodiment, a lookup table is used. The RECIP2 (operand1, operand2) instruction enables FPU 110 to produce a result equal to (1−operand1·operand2). The MADD instruction is a multiply-add instruction that enables FPU 110 to produce a result equal to (operand1+operand2·operand3). The RECIP1 and RECIP2 instructions are further described in U.S. patent application Ser. No. 09/364,787.

The Newton-Raphson algorithm for approximating the reciprocal of a number (R) can be implemented by configuring FPU 110 to execute the above-described instructions in the following sequence:

$$X_i = RECIP1(R);\quad\quad (1)$$

$$IR = RECIP2(R,X_i);\text{ and}\quad\quad (2)$$

$$X_{i+1} = MADD(X_i, X_i, IR).\quad\quad (3)$$

After FPU 110 executes the above three instructions in the above given sequence, the following quantity is obtained:

$$X_{i+1} = X_i + X_i \cdot IR = X_i + X_i(1 - R \cdot X_i) = 2X_i - R \cdot X_i \cdot X_i = X_i(2 - R \cdot X_i),$$

which is the Newton-Raphson approximation for the reciprocal of the number R.

In an embodiment, the floating-point ISA includes four instructions for performing an iteration of the Newton-Raphson algorithm for approximating reciprocal square roots. The four instruction are: RSQRT1 (operand1), RSQRT2 (operand1, operand2), MUL (operand1, operand2), and MADD (operand1, operand2, operand3).

The RSQRT1 (operand1) instruction enables FPU 110 to produce a result that is an estimate of the reciprocal square root of the operand. There are a variety of ways to produce the estimate. In one embodiment, a lookup table is used. The RSQRT2 (operand1, operand2) instruction enables FPU 110 to produce a result equal to: (1−operand1·operand2)/2. The MADD (operand1, operand2, operand3) instruction is described above. The MUL (operand1, operand2) instruction is a multiply instruction that enables FPU 110 to produce a result equal to: operand1·operand2. The RSQRT1 and RSQRT2 instructions are further described in U.S. patent application Ser. No. 09/364,787.

The Newton-Raphson algorithm for approximating the reciprocal square root of a number (R) can be implemented by configuring FPU 110 to execute the above-described instructions in the following sequence:

$$X_i = RSQRT1(R);\quad\quad (1)$$

$$IR1 = MUL(R,X_i);\quad\quad (2)$$

$$IR2 = RSQRT2(IR1,X_i);\text{ and}\quad\quad (3)$$

$$X_{i+1} = MADD(X_i, X_i, IR2).\quad\quad (4)$$

After FPU 110 executes the above four instructions in the above given sequence, $X_{i+1} = (3 - R \cdot X_i \cdot X_i) \cdot X_i/2$, which is the Newton-Raphson approximation for the reciprocal square root of the number R.

Each set of instructions shown above includes a MADD instruction. The MADD instruction has improved accuracy when executed using the MADD-flush-override mode described above. The IR value produced by the RECIP2 (R, $X_i$) instruction and the IR2 value produced by the RSQRT2 (IR1, $X_i$) instruction are usually small numbers. When these numbers are internally represented in the pseudo-normalized format as shown in FIG. 6A, a great deal of precision is achieved, thereby increasing the accuracy of the approximation. Additionally, when $X_i$ and IR (or IR2) are small numbers, the multiplication of $X_i$ with IR (or IR2) during execution of a MADD instruction (as provided in the foregoing sequences) can result in a denormalized number. However, when these values are maintained in the pseudo-normalized format, accuracy is maintained since denormalization processing is typically avoided.

For clarity, the invention has described in the context of single and double-precision floating-point representations that conform to the IEEE formats. However, the invention can be adopted for used with other floating-point representations, and this is within the scope of the invention.

FPU 200 can be implemented in various manners. For example, FPU 200 can be implemented in hardware within a digital signal processor, an application specific integrated circuit (ASIC), a microprocessor, and other hardware structures.

In addition to implementations of the invention using hardware, the invention can also be embodied in an article of manufacture comprised of a computer usable medium configured to store a computer-readable program code. The program code causes the enablement of the functions or fabrication, or both, of the hardware disclosed in this specification. For example, this might be accomplished through the use of general programming languages (e.g., C, C++, and so on), hardware description language (HDL), register transfer language (RTL), Verilog HDL, VHDL, AHDL (Altera hardware description language), or other programming and/or circuit (i.e., schematic) capture tools available in the art. As a specific example, the Verilog simulator "VCS v.4.1.1" by Synopsys, Inc. was used to simulate the invention. A book entitled "A Verilog HDL Primer" by J. Bhasker, Star Galaxy Pr., 1997 provides greater detail on Verilog HDL, and is incorporated herein by reference in its entirety for all purposes. In the program code implementation, FIG. 2 can serve as an embodiment of a flow diagram.

It is understood that the functions accomplished by the invention as described above can be represented in a core that can be utilized in programming code and transformed to hardware as part of the production of integrated circuits. Also, other implementations of the invention (e.g., FPU 200) using a combination of hardware and software are also possible. Therefore, the embodiments expressed above are within the scope of the invention and should also be considered protected by this patent.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A floating-point unit (FPU) configurable to perform multiply-add (Madd) operations comprising:
    a multiplier unit configured to receive and multiply mantissas for first and second floating-point operands to generate a multiplier output mantissa for a floating-point product of the first and second floating-point operands, wherein the multiplier unit is further configurable to operate in a first operating mode defined by the multiplier output mantissa being rounded, not normalized or denormalized, and having a pseudo-normalized format and a range greater than a normalized mantissa; and
    an adder unit coupled to the multiplier unit, the adder unit configured to receive and combine the multiplier output mantissa for the floating-point product and a mantissa for a third floating-point operand to generate an FPU output mantissa for a floating-point Madd result.

2. The FPU of claim 1, wherein the multiplier output mantissa is rounded at a bit position defined by IEEE standard.

3. The FPU of claim 1, wherein the multiplier output mantissa includes two bits of precision to the left of a binary point, and wherein the pseudo-normalized format is characterized by at least one of the two bits having a value of one.

4. The FPU of claim 1, wherein the multiplier output mantissa is rounded independent of a multiplier output exponent for the floating-point product.

5. The FPU of claim 1, wherein the multiplier output mantissa has approximately double the range as that of the mantissas for the first and second floating-point operands.

6. The FPU of claim 1, further comprising:
    a floating-point pipe file (PIP) configurable to unpack the mantissas for the first and second floating-point operands from a storage format to an internal format prior to processing by the multiplier unit.

7. The FPU of claim 6, wherein the storage format complies with IEEE standard.

8. The FPU of claim 6, wherein the internal format has increased resolution over the storage format, and wherein the PIP is configurable to convert the mantissas for the first and second floating-point operands to internal normalized representations prior to processing by the multiplier unit.

9. The FPU of claim 6, wherein the PIP is further configurable to pack the FPU output mantissa from the internal format to the storage format prior to transfer back to storage.

10. The FPU of claim 1, wherein the multiplier unit is further configurable to operate in one of a plurality of operating modes that include the first operating mode and a second operating mode, and wherein the second operating mode is characterized by the multiplier output mantissa confirming to IEEE standard.

11. The FPU of claim 10, wherein the multiplier unit is further configurable to normalize or denormalize, as necessary, and round the multiplier output mantissa in accordance with IEEE standard when operating in the second operating mode.

12. The FPU of claim 10, wherein the multiplier unit is further configurable to flush the multiplier output mantissa to zero or set the multiplier output mantissa to a particular value when a denormalized multiplier output is detected and the multiplier unit is operated in a third operating mode.

13. The FPU of claim 12, wherein the multiplier unit is configurable to detect a denormalized multiplier output by checking the multiplier output mantissa and a multiplier output exponent for the floating-point product.

14. A processor including the FPU of claim 1, wherein the FPU is configured to perform a set of operations selected to approximate a reciprocal of a number.

15. A processor including the FPU of claim 1, wherein the FPU is configured to perform a set of operations selected to approximate a reciprocal square root of a number.

16. A processor including the FPU of claim 1, wherein the FPU is configured to perform a set of operations selected to implement a Newton-Raphson algorithm.

17. The processor of claim 16, wherein the FPU is configured to perform at least one Madd operation to implement the Newton-Raphson algorithm.

18. A floating-point processor configurable to perform multiply-add (Madd) operations comprising:
    a multiplier unit that includes
        a multiplier array configured to receive and multiply mantassas for first and second floating-point operands, and
        a first rounding unit operatively coupled to the multiplier array, the first rounding unit configurable to round an output from the multiplier array to generate a multiplier output mantissa for a floating-point product of the first and second floating-point operands, wherein the multiplier output mantissa is not normalized or denormalized and has a pseudo-normalized format and a range greater than a normalized mantissa; and
    an adder unit coupled to the multiplier unit and including
        a carry propagation adder (CPA) configured to receive and combine the multiplier output mantissa for the floating-point product and a mantissa for a third floating-point operand,
        a second rounding unit coupled to the CPA, the second rounding unit configured to receive and round a mantissa from the CPA, and
        a normalization unit coupled to the second rounding unit, the normalization unit configured to receive and normalize a rounded mantissa from the second rounding unit.

19. The processor of claim 18, wherein the multiplier unit is configurable to operate in one of a plurality of operating modes that includes a first operating mode and a second operating mode, wherein the first rounding unit in the multiplier unit is configurable to round the multiplier output mantissa in the pseudo-normalized format when the multiplier unit is operated in the first operating mode, and wherein the first rounding unit is further configurable to round the multiplier output mantissa in accordance with IEEE standard when the multiplier unit is operated in the second operating mode.

20. The processor of claim 19, wherein the first rounding unit in the multiplier unit is further configurable to flush the multiplier output mantissa to zero or set the multiplier output mantissa to a particular value if a denormalized multiplier output is detected and the multiplier unit is operated in a third operating mode.

21. The processor of claim 18, wherein the multiplier output mantissa is rounded at a bit position defined by IEEE standard.

22. The FPU of claim 18, wherein the multiplier output mantissa includes two bits of precision to the left of a binary point, and wherein the pseudo-normalized format is characterized by at least one of the two bits having a value of one.

23. An article of manufacture comprising:
  computer-readable program code for causing a computer to describe a multiplier unit, wherein the multiplier unit is configured to receive and multiply mantissas for first and second floating-point operands to generate a multiplier output mantissa for a floating-point product of the first and second floating-point operands, wherein the multiplier unit is further configurable to operate in a first operating mode defined by the multiplier output mantissa being rounded, not normalized or denormalized, and having a pseudo-normalized format and a range greater than a normalized mantissa;
  computer-readable program code for causing the computer to describe an adder unit, wherein the adder unit is coupled to the multiplier unit and configured to receive and combine the multiplier output mantissa for the floating-point product and a mantissa for a third floating-point operand to generate an FPU output mantissa for a floating-point result; and
  a computer-usable medium configured to store the computer-readable program codes.

24. An article of manufacture comprising:
  computer-readable program code for causing a computer to describe a multiplier unit, wherein the multiplier unit includes a multiplier array operatively coupled to a first rounding unit, wherein the multiplier array is configured to receive and multiply mantissas for first and second floating-point operands, wherein the first rounding unit is configurable to round an output from the multiplier array to generate a multiplier output mantissa for a floating-point product of the first and second floating-point operands, and wherein the multiplier output mantissa is not normalized or denormalized and has a pseudo-normalized format and a range greater than a normalized mantissa;
  computer-readable program code for causing the computer to describe an adder unit, wherein the adder unit couples to the multiplier unit and includes a carry propagation adder (CPA), a second rounding unit, and a normalization unit, wherein the CPA is configured to receive and combine the multiplier output mantissa for the floating-point product and a mantissa for a third floating-point operand, wherein the second rounding unit is coupled to the CPA and configured to receive and round a mantissa from the CPA, and wherein the normalization unit is coupled to the second rounding unit and configured to receive and normalize a rounded mantissa from the second rounding unit; and
  a computer-usable medium configured to store the computer-readable program codes.

25. A computer program product for performing a floating-point multiply-add (Madd) operation comprising:
  code that multiplies mantissas for first and second floating-point operands to generate a third mantissa for a floating-point product of the first and second floating-point operands;
  code that rounds the third mantissa for the floating-point product to generate a fourth mantissa for a floating-point intermediate result, wherein the fourth mantissa is not normalized or denormalized, has a pseudo-normalized format, and has a range greater than a normalized mantissa;
  code that combines the fourth mantissa for the floating-point intermediate result and a mantissa for a third floating-point operand to generate an output manitssa for a floating-point Madd result; and
  a data storage medium configured to store the codes.

26. A computer program product comprising:
  code that defines a multiplier unit, wherein the multiplier unit is defined to receive and multiply mantissas for first and second floating-point operands to generate a multiplier output mantissa for a floating-point product of the first and second floating-point operands, wherein the multiplier output mantissa is rounded, not normalized or denormalized, and has a pseudo-normalized format and a range greater than a normalized mantissa;
  code that defines an adder unit, wherein the adder unit is coupled to the multiplier unit and defined to receive and combine the multiplier output mantissa for the floating-point product and a mantissa for a third floating-point operand to generate an FPU output mantissa for a floating-point result; and
  a data storage medium configured to store the codes.

* * * * *

UNITED STATES PATENT AND TRADEMARK OFFICE
CERTIFICATE OF CORRECTION

PATENT NO. : 7,346,643 B2 Page 1 of 1
APPLICATION NO. : 09/364512
DATED : March 18, 2008
INVENTOR(S) : Ho et al.

It is certified that error appears in the above-identified patent and that said Letters Patent is hereby corrected as shown below:

Title page
At the end of the Item (*) Notice Section, insert --This patent is subject to a terminal disclaimer.--.

Column 1
Line 10, replace "09/364,512" with --09/364,514--.

Column 18
Line 34, replace "mantassas" with --mantissas--.

Column 20
Line 30, replace "manitssa" with --mantissa--.

Signed and Sealed this

Twenty-first Day of October, 2008

JON W. DUDAS
*Director of the United States Patent and Trademark Office*